United States Patent [19]

Overbergh

[11] 4,379,887

[45] Apr. 12, 1983

[54] ADHESIVE COMPOSITION

[75] Inventor: Noel M. M. Overbergh, Bertem, Belgium

[73] Assignee: Raychem Corporation, Menlo Park, Calif.

[21] Appl. No.: 364,087

[22] Filed: Mar. 31, 1982

Related U.S. Application Data

[63] Continuation of Ser. No. 262,873, May 12, 1981, abandoned.

[30] Foreign Application Priority Data

May 12, 1980 [GB] United Kingdom ................. 8015576

[51] Int. Cl.$^3$ ............................................. C08L 77/07
[52] U.S. Cl. .................................... 525/184; 525/426; 525/910
[58] Field of Search ........................ 525/910, 184, 426

[56] References Cited

U.S. PATENT DOCUMENTS 3,862,102  1/1975  Miltovich ............................ 525/910
4,058,657 11/1977  Ireland .
4,242,415 12/1980  Feltzin ................................ 525/910

FOREIGN PATENT DOCUMENTS 1456654 11/1976 United Kingdom .
1504723  3/1978 United Kingdom .

OTHER PUBLICATIONS

Japanese Patents Abstracts, vol. 4, No. 42, (C-5) (524) and JP-A-55 16045, Nippon Gosei Gomu (Apr. 2, 1980).

Chemical Abstracts, vol. 92, 1980, p. 37, Ref. No. 95207j, Columbus, Ohio, (United States) and JP-A-79 111 548, (Saotome) (Aug. 31, 1979).

*Primary Examiner*—Paul Lieberman
*Attorney, Agent, or Firm*—Edith A. Rice; Herbert G. Burkard

[57] ABSTRACT

An adhesive composition is produced by reacting a thermoplastic polyamide having reactive amine groups attached to the polyamide molecule with a vinyl terminated rubber, preferably a vinyl terminated polybutadiene rubber.

The adhesive composition exhibits good peel strengths at high temperatures together with good low temperature flexibility.

31 Claims, No Drawings

ADHESIVE COMPOSITION

This is a continuation of application Ser. No. 262,873, filed May 12, 1981, now abandoned.

This invention relates to an adhesive composition, a method of making it, and articles coated therewith.

The invention is more particularly concerned with hot-melt adhesives based on polyamides. Such adhesives have frequently been used for bonding to substrates formed from olefin polymers for example cable sleeves, and to dimensionally heat-recoverable articles (formed from olefin polymers or otherwise) for example end caps, splice cases and the like. An example of an adhesive that has been used for this purpose is the polyamide hot-melt adhesive sold by General Mills Chemicals Inc. under the trade name "Versalon 1300".

The present invention provides an adhesive composition produced by mixing a thermoplastic polyamide having reactive amine groups attached to the polyamide molecule with a vinyl-terminated rubber, preferably a liquid rubber.

Preferably the rubber is a vinyl-terminated polybutadiene, or a vinyl terminated acrylonitrile, and most preferably a vinyl-terminated polybutadiene nitrile, which may have pendant vinyl units along the polymer chain in addition to the terminal vinyl groups.

The preferred vinyl-terminated polybutadiene nitrile may be represented by the general formula I:

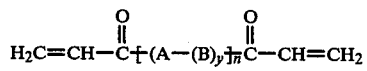

where A is a butadiene unit that is bonded at the 1 and 2 or the 1 and 4 position, B is an acrylonitrile unit, and n is selected to provide the desired molecular weight, preferably to provide a liquid rubber. Preferably y (which may vary along the polymer molecule), is in the range of from 0 to 1, especially from 0 to 0.6 or is 1, and n is not more than 400. The molecular weight of the rubber is advantageously not more than 20000, more advantageously not more than 10000 and preferably from 2000 to 5000. The term "rubber" is intended to refer to polymers having a glass transition temperature below ambient temperatures (20° C.), and includes polymers that are elastomeric at low temperatures but which may be liquid at ambient temperatures. The preferred rubbers will have glass transition temperatures below −20° C., most preferably below −40° C.

It has been found that surprising improvements in properties such as low temperature flexibility and impact brittleness, high temperature cohesive strength, and improved adhesion over a broader temperature range can be achieved by the compositions according to the present invention, which is believed to be due to a Michael addition reaction between the reactive amine groups of the rubber, which reaction appears to proceed slowly even at room temperature after melt mixing of the polyamide and the rubber, but is preferably carried more quickly to substantial completion by maintaining the melt phase for a sufficient time, for example 25 to 30 minutes at 120° C.

Compositions containing up to 30% by weight, preferably up to 25% by weight, and especially up to 15% by weight of the liquid rubber based on the weight of the polyamide, are preferred for most purposes. In many applications it will be desirable for the composition to contain at least 5% by weight of the rubber but lower rubber contents, e.g. 2.5% by weight or less may be preferred in certain applications.

The polyamides used in the present invention preferably have a number average molecular weight of from 2000 to 10,000, a softening point of from 65° to 150° C., especially from 85° to 105° C. although it may have a softening point in the range of from 90° C. to 150° C., and an amine equivalent of from 70 to 400 (amine equivalent being the number of milliequivalents of perchloric acid required to neutralise one kilogram of the polyamide). Especially suitable polyamides for use in the present invention are based on dibasic acids, especially dimer acids, and although small amounts of tribasic and higher acids, e.g. trimer acid, may be present it is strongly preferred that they should not total more than 10% by weight of the acid component of the polyamide.

Typical polyamides are the condensation interpolymers of at least one diamine with one or more dibasic acids, with dimer acid being the preferred major dibasic acid component. These polyamides may be obtained by conventional amidification procedures and are generally prepared by reacting a molar excess of the amine group containing molecules with the carboxylic acid group containing molecules. The amount of excess amine utilised should be sufficient to provide a polyamide having an amine equivalent ranging from 70 to 400, preferably 90 to 200.

Suitable diamines and acids are described, for example, in U.S. Pat. No. 4,181,775, the disclosure of which is incorporated herein by reference.

As mentioned above, the polyamides used in the compositions according to the present invention preferably have a number average molecular weight in the range of from 2000 to 10000, more preferably from 3000 to 7000. The number average molecular weight is appropriately measured by vapour phase osmometry (see "Polymer Handbook" 2nd edition, John Wiley and Sons, New York and "Polymer Science" Book 1, pp. 140–41, North Holland Publishing Company, Amsterdam).

For the adhesive to exhibit good low temperature properties, (i.e. it should not be brittle or frangible under severe winter conditions), it is preferable for the polyamide to have a glass transition temperature below 10° C., preferably below 0° C. The glass transition temperature may be measured by differential scanning calorimetry (see, for example, "The Reagent Heat" A. A. Duswalt, Industrial Research, July 1975, p. 42) or by dynamic mechanical analysis.

A preferred use for the adhesive of the present invention is with heat-recoverable products such as sleeves and end caps, usually made from cross-linked olefin polymers especially polyethylene, and the present invention accordingly provides a heat-recoverable article provided with a layer of such an adhesive. In these articles, as discussed above, it is desirable for the adhesive to melt and flow simultaneously with the recovery of the article. The adhesive is especially useful in connection with heat-recoverable splice cases, for example for providing an adhesive mass located on a branch-off clip to be inserted into one or each end of the splice case such as described in German Offenlegungsschrift No. 2 900 518, the disclosure of which is incorporated herein by reference. Another use is as a sealant/adhesive lining in arrangements to prevent overheating of cable jackets, especially small cable jackets in the region of the end of the heat-recoverable splice case. Accordingly, the polyamides used in the adhesives of the present invention preferably have a softening point lying in the range of from 90° C. to 150° C., especially from 90° C. to 135° C. as measured by the ring-and-ball softening point method according to ASTM E-28.

As indicated above, the polyamides used in the present invention may readily be prepared by conventional techniques. Some commercially available polyamides suitable for use in the present invention are described in U.S. Pat. Nos. 3,249,629 and 3,449,273 and amongst especially suitable materials there may be mentioned Versalon 1300, Versalon 1140, Versalon TPX 600 and Type 401 (all available from General Mills Chemicals, Inc) and Eurelon 2130 and Eurelon 1140 (both available from Schering AG). These meterials are all believed to be based on dimer acids, and have the following properties.

| Material | Softening Point °C. | Viscosity Poise | Mol. Weight | Glass Transition °C. | Amine Equivalent |
|---|---|---|---|---|---|
| Versalon 1300 | c. 95 | c. 20(2000° C.) | c.6500 | c. −2 | c.130 |
| Versalon 1140 | c.140 | c.100(200° C.) | c.4000 | c. 0 | c.140 |
| Versalon TPX 600 | c.135 | c.200(225° C.) | c.4000 | c. −5 | c.130 |
| Type 401 | c.120 | c. 90(200° C.) | c.3500 | c. −20 | c.140 |
| Eurelon 2130 | c.130 | c. 35(200° C.) | c.4000 | c. −15 | c.125 |
| Eurelon 1140 | c.140 | c.100(200° C.) | c.4000 | c. 0 | c.140 |

Other especially suitable polyamides may be made from substantially pure dimer acids.

It has been found that the addition of the vinyl terminated rubber to the polyamide, and particularly to the polyamides having a molecular weight greater than 6000, extends the temperature range over which the polyamide softens, thereby leading to increased peel strengths at high temperatures. If desired, the softening temperature range can be shifted to lower temperatures, without any unacceptable reduction in the temperature range, by incorporating a quantity, preferably from 5 to 20% by weight based on the weight of the polyamide components, of a liquid polyamide. Liquid polyamides that may be used may have an amine equivalent of from 0 to about 3000, and include for example the polyamide sold by Schering AG under the trade name "Versamid 100". If the liquid polyamide is more reactive than the thermoplastic polyamide, it should be incorporated in the composition after the thermoplastic polyamide and the rubber have substantially completely reacted because otherwise the rubber would tend to react with the liquid polyamide in preference to the thermoplastic polyamide.

It is also possible to add a compatible, less reactive, polyamide of lower softening point than that of the thermoplastic polyamide, for example having a softening point of from about 65° to 90°, preferably from 75° to 80° C. and an amine equivalent of 40 or less, especially 20 or less. Because the compatible polyamide is less reactive than the thermoplastic polyamide, both polyamides may be blended before addition of the vinyl terminated rubber. Blending a lower softening point polyamide with the thermoplastic polyamide will produce a blend having an intermediate softening point and increased low temperature flexibility. The addition of the vinyl terminated rubber will not only improve further the low temperature flexibility of the blend but also because it increases the high temperature adhesive performance of the polyamide, but will allow a correspondingly greater quantity of the low softening temperature polyamide to be incorporated.

Where rubbers having pendant vinyl groups are blended with the polyamides, the rubber may tend to produce crosslinking in the composition above a certain concentration of the rubber which can be detected by gelling of the composition. The crosslinking so produced tends to increase the viscosity of the resulting composition as the proportion of the rubber increases until the cross-linking reaction becomes saturated, whereafter further additions of the rubber remain unreacted and thus tend to lower the viscosity by virtue of a dilution effect. Rises in viscosity and softening point as a result of the reaction can be counterbalanced to some extent by later addition of liquid polyamide, as mentioned above. The liquid polyamide tends to be compatible with the other components, and needs to be mixed for only a few minutes to produce a uniform mixture.

In some instances, often where other components e.g. other polyamides are to be incorporated, it is desirable that no crosslinking occurs, and so, in such instances the rubber is preferably present in an amount of up to the minimum amount required to produce gelling of the composition. The gelling may be detected by the presence of a fraction of the composition that remains insoluble after boiling in chlorobenzene for 24 hours.

The preferred vinyl-terminated liquid rubbers for use in the present invention are those sold under the trademarks Hycar VTB, which is a simple vinyl-terminated polybutadiene, Hycar VTBN, which is a vinyl-terminated polybutadiene nitrile, and Hycar VTBNX, which is a vinyl-terminated polybutadiene nitrile having extra vinyl units attached along the polymer chain. In the case of Hycar VTBNX, crosslinking begins to ocur at about 15% by weight of rubber based on the polyamide.

The glass transition temperature of the polyamide is dramatically affected by the addition of the rubber in accordance with the present invention. The glass transition temperature (Tg) of Versalon 1300 is −2° C., but on adding the VTBNX liquid rubber a second peak appears at −20° C. and this peak increases in importance with increasing VTBNX content. At 20% by weight VTBNX, the peak at −20° C. dominates. Addition of the VTB liquid rubber produces a new peak at −60° C., cross-linking being substantially absent with this bifunctional liquid rubber.

The flow characteristics are also affected, Versalon 1300 itself being brittle below 0° C. and flowing above 60° C., whereas after the reaction with VTBNX liquid rubber the composition is ductile at minus 20° C. and rubbery without flowing at 60° to 80° C. with good cohesive strength and high ultimate elongation.

The peel adhesion characteristics of Versalon 1300 are improved at all temperatures up to 80° C. by the addition of VTBNX liquid rubber up to concentration of 30% by weight, and are improved at temperatures of 60° to 80° C. by the addition of VTB liquid rubber, the peel strength at lower temperatures tending to be decreased by addition of VTB.

It will be appreciated that improved low temperature flexibility and adhesion and/or high temperature adhesion and cohesive strengths are advantageous in practice. When the adhesives are used in the aforementioned heat-shrinkable articles, the improved low temperature performance can overcome problems arising from inadequate moisture seals when such sleeves using previously known adhesives are installed at low temperatures, e.g. down to −15° C. Addition of liquid polyamides such as Versamid 100 to the system is a convenient way of shifting the flow temperature range without unacceptably affecting the peel strength of the composition at room temperature.

Thus, the average softening point of the adhesive compositions according to the present invention can be made substantially the same as for previously known polyamide hot-melts, with the broader flow temperature range improving the wetting and flow to facilitate installation in the field. The present adhesive compositions could if desired be compounded with additives such as waxes, fillers, pigments, tackifiers, plasticisers and other materials known for such purposes, but are preferably used alone, or with only a minor amount (e.g. 2% by weight) of a suitable antioxidant. Blends of the adhesive compositions with other polymers or adhesive compositions can also be made, if desired, to suit specific purposes.

As mentioned above, the adhesives of the present invention are especially adapted for use with heat-recoverable products and, accordingly, in one aspect of the present invention provides a heat-recoverable article at least one principal surface of which is coated with the adhesive composition. Typically the coating thickness is from 0.2 to 1.2, preferably 0.5 to 1 mm.

Amongst such heat-recoverable articles there may be mentioned heat-shrinkable sleeves and end caps for the joinder, encapsulation, insulation, corrosion protection and termination of electrical equipment, especially wires and cables, and service lines, e.g. oil pipes. Other heat-recoverable articles to which the adhesives of the present invention may advantageously be applied include so-called "wrap-around" sleeves as described, for example, in U.S. Pat. No. 3,379,218 and British Pat. Nos. 1,155,470; 1,211,988 and 1,346,479 and the XAGA cable splice described in British Pat. No. 1,431,167. However, the adhesives may, of course, be used in other applications not involving heat-recoverable products. One such application is, for example, in the duct-seal devices described in British patent application No. 45625/76.

The following Examples illustrate the adhesive compositions according to the present invention.

EXAMPLE 1

Adhesive compositions according to the invention were prepared by melt mixing 100 parts by weight of a thermoplastic polyamide (Versalon 1300) with 2 parts by weight of a hindered phenol antioxidant (Irganox 1010) and varying quantities of a vinyl terminated butadiene-nitrile rubber having pendant vinyl groups (Hycar VTBNX) in a sigma blade mixer for 30 minutes at 120° C.

Peel strengths at various temperatures were determined by recovering a heat-shrinkable polyethylene strip about a test drum of 25 mm diameter and 25 mm axial length. A second polyethylene strip was wrapped around the drum and bonded to the first strip by means of the adhesive composition and the drum was left in an oven at 150° C. for 20 minutes.

The drum was then mounted with its axis horizontal so that it was freely rotatable. The second polyethylene strip was pulled off at a rate of 50±5 mm per minute and the force required to pull the strip off was recorded as the peel strength. The results are shown in Table I.

TABLE I

| PARTS HYCAR VTBNX | PEEL STRENGTH (N/25mm) TEMPERATURE (°C.) | | | | |
|---|---|---|---|---|---|
| | R.T. | 40 | 60 | 70 | 80 |
| 0 (Control) | 400 | 300 | 100 | 16 | 0 |
| 5 | 450 | 380 | 216 | 76 | 35 |
| 10 | 350 | 265 | 255 | 141 | 78 |
| 20 | 470 | 390 | 203 | 140 | 92 |
| 30 | 137 | — | 23 | 42 | 22 |

Low temperature flexibility was determined in accordance with ASTM-D 3111 using three samples of the adhesive composition and recording the temperature at which one sample failed. The results are shown in Table II.

TABLE II

| PARTS HYCAR VTBNX | FAILURE TEMPERATURE (°C.) |
|---|---|
| 0 (Control) | −5 |
| 5 | −10 |
| 10 | −20 |
| 20 | −35 |

EXAMPLE 2

The procedure of Example 1 was repeated with the exception that the Hycar VTBNX was replaced by a vinyl terminated butadiene rubber having no pendant vinyl groups (Hycar VTB). The peel strength and low temperature flexibility were determined as in Example 1 and the results are shown in Table III.

TABLE III

| PARTS HYCAR VTB | PEEL STRENGTH (N/25mm) Temperature (°C.) | | | | FAILURE TEMPERATURE (°C.) ASTM-D 3111 |
|---|---|---|---|---|---|
| | RT | 40 | 60 | 70 | |
| 0 (Control) | 400 | 300 | 100 | 16 | −5 |
| 5 | 202 | 161 | 86 | 72 | −15 |
| 10 | 144 | 72 | — | 35 | −20 |

EXAMPLE 3

Three adhesive compositions were prepared by melt mixing 100 parts of a thermoplastic polyamide (Versalon 1300) with quantities of Irganox 1010 antioxidant and vinyl terminated butadiene-nitrile rubber with pendant vinyl groups (Hycar VTBNX) in a sigma blade mixer for 30 minutes at 120° C. Thereafter, quantities of Versamid 100 were added and mixed for two or three minutes to obtain adequate uniformity.

The adhesive compositions were used to seal a number of heat shrinkable telephone splice cases sold by Raychem under the trade name VASM, the splice cases being installed in accordance with Raychem installation procedure TC 019/1P-1/11-79 at a number of different ambient temperatures. After installation, the splice cases were pressurized with a 40 kPa internal gas pressure and subjected to a temperature cycling procedure in which the temperature was raised from −30° C. to +60° C. over a period of 2 hours, maintained at +60° C. for 4 hours, reduced to −30° C. over a period of 2 hours and maintained at −30° C. for four hours each cycle. Failure of the adhesive was detected by leakage of the gas from the splice. The results are shown in Table IV together with the results for a conventional polyamide hot-melt adhesive based on Versalon 1300, from which it can be seen that all the adhesives according to the invention are suitable for installation at −5° C. and some at temperatures below this.

SAMPLE

| Component | (Parts by weight) | | |
|---|---|---|---|
| | A | B | C |
| Versalon 1300 | 100 | 100 | 100 |
| Hycar VTBNX | 5 | 5 | 2.5 |
| Versamid 100 | 20 | 12.5 | 20 |
| Irganox | 2 | 2 | 1.5 |

TABLE IV

TEMPERATURE CYCLING

| | | No. of cycles to failure | | | |
|---|---|---|---|---|---|
| INSTALLATION TEMPERATURE (°C.) | VASM TYPE | A | B | C | Polyamide Control |
| Room Temp/ | 2/6 | >100 | >100 | >100 | >100 |
| " | 3/6 | >100 | >100 | >100 | >100 |
| " | 4/6 | >100 | >100 | >100 | >100 |
| −5 | 2/6 | >100 | >100 | >100 | 50% <1 |
| " | 3/6 | >100 | >100 | >100 | <1 |
| " | 4/6 | >100 | >100 | >100 | <1 |
| −10 | 2/6 | >100 | 6 | >100 | <1 |
| " | 3/6 | 14 | <1 | >100 | <1 |
| " | 4/6 | >100 | <1 | >100 | <1 |
| −15 | 2/6 | 56 | <1 | >100 | <1 |
| " | 3/6 | 14 | < | >100 | <1 |
| " | 4/6 | <1 | <1 | >100 | <1 |

EXAMPLE 4

An adhesive composition was prepared by melt mixing 85 parts of a thermoplastic polyamide having a softening point from 75° to 80° C. and an amine equivalent of less than 20, with 15 parts of Versalon 1300 polyamide and 2 parts of Irganox 1010 antioxidant in a sigma blade mixer. After formation of a uniform blend, 1.5 parts (i.e. 10% by weight based on the Versalon 1300) of Hycar VTBNX rubber was mixed in followed by 25 parts of a polyethylene/butyl acrylate copolymer (Lupolene A2910M) and 10 parts of Hoechst A WACHS, and the composition was blended for a further 30 minutes at 120° to 150° C. The resulting composition exhibited excellent high temperature adhesion and low temperature flexibility. If desired, one or more tackifiers and/or plasticisers may be incorporated into the composition in order to control the viscosity and flow temperature.

I claim:

1. An adhesive composition produced by mixing a thermoplastic polyamide having reactive amine groups attached to the polyamide molecule with a vinyl-terminated rubber.

2. A composition as claimed in claim 1, wherein the rubber is a liquid rubber.

3. A composition as claimed in claim 1, wherein the rubber is a vinyl-terminated polybutadiene rubber.

4. A composition as claimed in claim 3, wherein the rubber is a vinyl-terminated polybutadiene nitrile rubber.

5. A composition as claimed in claim 1, wherein the rubber has pendant vinyl units along the polymer chain.

6. A composition as claimed in claim 1, wherein the vinyl-terminated polybutadiene nitrile has the general formula I

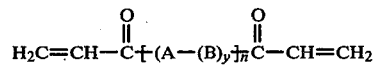

where A is a butadiene unit that is bonded at the 1 and 2 or the 1 and 4 positions, B is an acrylonitrile unit, and n is selected to produce the required molecular weight.

7. A composition as claimed in any one of claims 1 to 6, which comprises up to 30% by weight, based on the weight of the polyamide, of the rubber.

8. A composition as claimed in any one of claims 1 to 6, which comprises up to 25% by weight, based on the weight of the polyamide, of the rubber.

9. A composition as claimed in any one of claims 1 to 6, which comprises up to 15% by weight, based on the weight of the polyamide, of the rubber.

10. A composition as claimed in claim 5, wherein the rubber is present in an amount of up to the minimum amount required to produce gelling of the composition.

11. A composition as claimed in claim 1, which further comprises a liquid polyamide.

12. A composition as claimed in claim 11, wherein the liquid polyamide is present in an amount in the range of from 5 to 20% by weight, based on the weight of the polyamide components.

13. A composition as claimed in claim 1, which further comprises a less reactive polyamide which is compatible with the thermoplastic polyamide.

14. A composition as claimed in claim 13, wherein the said less reactive polyamide has a lower softening point than that of the thermoplastic polyamide.

15. A composition as claimed in claim 1, wherein the polyamide has a number average molecular weight greater than 6000.

16. A composition as claimed in claim 1, wherein the polyamide has an amine equivalent in the range of from 70 to 400.

17. A process for preparing an adhesive composition which comprises mixing a thermoplastic polyamide having reactive amine groups attached to the polyamide molecule with a vinyl-terminated rubber and maintaining the composition so formed at an elevated temperature for sufficient time to allow the polyamide and rubber to react substantially completely.

18. A process as claimed in claim 17, wherein the polyamide and rubber are melt mixed.

19. A process as claimed in claim 17, wherein the rubber is a liquid rubber.

20. A process as claimed in claim 17, wherein the rubber is a vinyl-terminated polybutadiene rubber.

21. A process as claimed in claim 20, wherein the rubber is a vinyl-terminated polybutadiene acrylonitrile rubber.

22. A process as claimed in claim 17, wherein the rubber has pendant vinyl units along the polymer chain.

23. A process as claimed in claim 17, wherein the vinyl-terminated polybutadiene nitrile has the general formula I:

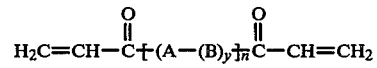

where A is a butadiene unit that is bonded at the 1 and 2 or the 1 and 4 positions, B is an acrylonitrile unit, and n is selected to produce the required molecular weight.

24. A process as claimed in claim 17, wherein the rubber is mixed in an amount of up to 30% be weight, based on the weight of the polyamide.

25. A process as claimed in claim 24, wherein the rubber is mixed in an amount of up to 25% by weight, based on the weight of the polyamide.

26. A process as claimed in claim 25, wherein the rubber is mixed in an amount of up to 15% by weight, based on the weight of the polyamide.

27. A process as claimed in claim 22, wherein the rubber is mixed in an amount of up to the minimum amount required to produce gelling of the composition.

28. A process as claimed in claim 17, which includes the step of incorporating a liquid polyamide in the composition.

29. A process as claimed in claim 28, wherein the liquid polyamide is more reactive than the thermoplastic polyamide and is incorporated in the composition after the thermoplastic polyamide and the rubber have substantially completely reacted.

30. An adhesive composition prepared by a process as claimed in any one of claims 17 to 29.

31. A dimensionally heat-recoverable article having a coating of a composition as claimed in claim 1.

* * * * *